(12) United States Patent
Hsu

(10) Patent No.: US 8,671,290 B2
(45) Date of Patent: Mar. 11, 2014

(54) HEAT DISSIPATING DEVICE

(75) Inventor: Hsin-Jung Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 227 days.

(21) Appl. No.: 13/159,793

(22) Filed: Jun. 14, 2011

(65) Prior Publication Data

US 2012/0131363 A1  May 24, 2012

(30) Foreign Application Priority Data

Nov. 23, 2010 (TW) ................................ 99140434 A

(51) Int. Cl.
*G06F 1/16* (2006.01)
*G06F 1/20* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| 2009/0167228 | A1* | 7/2009 | Chung et al. ................ 318/455 |
| 2009/0266511 | A1* | 10/2009 | Yang .......................... 165/80.2 |
| 2011/0224837 | A1* | 9/2011 | Moss et al. ................... 700/295 |
| 2011/0251733 | A1* | 10/2011 | Atkinson et al. ............. 700/300 |
| 2012/0116590 | A1* | 5/2012 | Florez-Larrahondo et al. ..................... 700/275 |

* cited by examiner

*Primary Examiner* — M Elamin
(74) *Attorney, Agent, or Firm* — CKC & Partners Co., Ltd.

(57) ABSTRACT

A heat dissipating device is provided. The heat dissipating device includes at least one fan, a temperature detecting unit, a fan control unit, and a power consumption control unit. The temperature detecting unit detects a temperature inside the host. The fan control unit controls the rotating speed of the fan. The power consumption control unit calculates the total power consumption of the host, and outputs a control signal to the fan control unit according to the temperature inside the host and the total power consumption of the host, so as to adjust the rotating speed of the fan.

5 Claims, 2 Drawing Sheets

HEAT DISSIPATING DEVICE

CROSS-REFERENCE TO RELATED APPLICATION

This application claims the priority benefit of Taiwan application serial no. 99140434, filed Nov. 23, 2010. The entirety of the above-mentioned patent application is hereby incorporated by reference herein and made a part of this specification.

BACKGROUND OF THE INVENTION

1. Field of the Invention

The present invention generally relates to a heat dissipating device and a method thereof, in particular, to a heat dissipating device capable of controlling power consumption and a method for controlling a heat dissipating power consumption.

2. Description of Related Art

Generally, some computer devices are configured with two power supplies and four main boards. Assume that the rated voltages of the two power supplies are respectively 1100 W, and the maximum power consumption of each main board is about 350 W, that is, a power consumption is 350×4=1400 W when the four main boards are in operation at the same time. In a situation that the two power supplies supply power normally (that is, the electric quantity supplied by the power supplies is 2200 W), the provided electric quantity is enough for the normal operation of the four main boards.

However, the power supply may go out of order or be damaged (that is, the power supply fails to provide power for the main boards), and therefore, only one power supply of the computer device can supply power normally. At this time, the computer device initiates a power throttling feature to reduce the power consumption of the main boards (for example, reduce a working frequency of a Central Processing Unit (CPU) of the main board), so that the main boards may maintain the normal operation. However, the performance of the computer device will be degraded when the power throttling feature is initiated to reduce the working frequency of the CPU of the main board.

SUMMARY OF THE INVENTION

The present invention is directed to a heat dissipating device and a method thereof, which can control the power consumption of a system more accurately, so as to avoid unnecessary power waste.

The present invention provides a heat dissipating device, which is applicable to a host, and the host includes a Power Supply Unit (PSU). The heat dissipating device includes at least one fan, a temperature detecting unit, a fan control unit, and a power consumption control unit. The temperature detecting unit detects a temperature inside the host. The fan control unit, coupled with the fan, is used for controlling rotating speed of the fan. The power consumption control unit, coupled with the PSU, the temperature detecting unit, the fan control unit, and the PSU of the host, is used for calculating a total power consumption of the host, and outputting a control signal to the fan control unit according to the temperature inside the host and the total power consumption of the host, so as to adjust the rotating speed of the fan.

In an embodiment of the present invention, the power consumption control unit adjusts the rotating speed of the fan according to the temperature inside the host when the total power consumption of the host does not exceed a threshold total power consumption, and controls the fan control unit to lower the rotating speed of the fan when the total power consumption of the host exceeds a threshold total power consumption, so as to reduce the total power consumption of the host to the threshold total power consumption.

In an embodiment of the present invention, the heat dissipating device further includes a storage unit, which, coupled with the power consumption control unit, is used for storing a duty cycle comparison table of the temperature inside the host and the control signal, and a comparison table of the rotating speed of the fan and the power consumption of the fan. The power consumption control unit controls the fan control unit to adjust the rotating speed of the fan according to the duty cycle comparison table and the power consumption comparison table.

In an embodiment of the present invention, a duty cycle of the control signal is directly proportional to the temperature inside the host.

In an embodiment of the present invention, the power consumption control unit and the PSU perform signal transmission therebetween through a power supply management bus.

The present invention also provides a heat dissipating method of a heat dissipating device, in which the heat dissipating device is applicable to a host, and the heat dissipating device includes at least one fan. The heat dissipating method includes: detecting a temperature inside the host, calculating a total power consumption of the host, and adjusting the rotating speed of a fan according to the temperature inside the host and total power consumption of the host.

In an embodiment of the present invention, the step of adjusting the rotating speed of a fan includes: judging whether the total power consumption of the host exceeds a threshold total power consumption; if the total power consumption of the host does not exceed the threshold total power consumption, adjusting the rotating speed of the fan according to the temperature inside the host; and if the total power consumption of the host exceeds the threshold total power consumption, lowering the rotating speed of the fan, so as to reduce the total power consumption of the host to the threshold total power consumption.

In an embodiment of the present invention, the threshold total power consumption is a minimum total power consumption required by the host in a stable state.

Based on the above, in the present invention, the rotating speed of the fan is adjusted according to the temperature inside the host and the total power consumption of the host, thereby accurately controlling the power consumption and avoiding unnecessary power waste.

In order to make the aforementioned features and advantages of the present invention comprehensible, embodiments are described in detail below with reference to the accompanying drawings.

DESCRIPTION OF THE EMBODIMENTS

Figure 1:
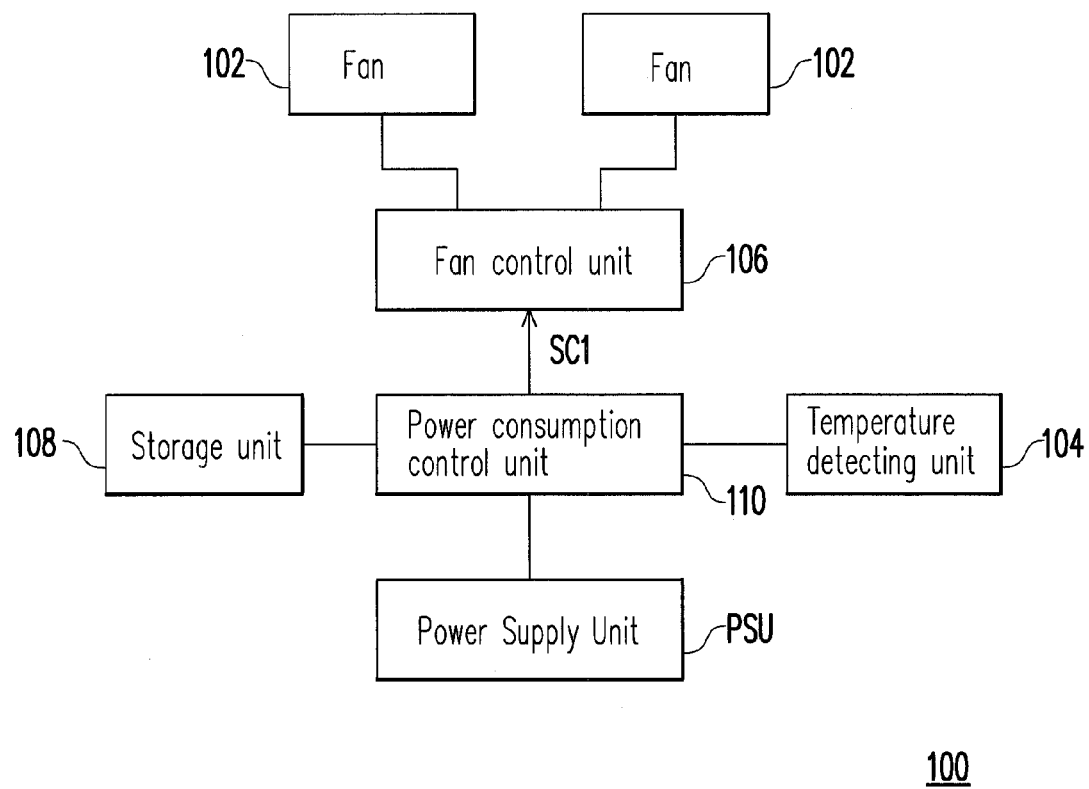
FIG. 1 is a schematic view of a heat dissipating device according to an embodiment of the present invention.

FIG. 1 is a schematic view of a heat dissipating device according to an embodiment of the present invention. Referring to FIG. 1, a heat dissipating device 100 is applicable to a server or a host of a computer system. The heat dissipating device 100 includes at least one fan 102 (two fans in this embodiment, but not limited thereby), a temperature detecting unit 104, a fan control unit 106, a storage unit 108, and a power consumption control unit 110. The fans 102 are coupled with the fan control unit 106. The power consumption control unit 110 is coupled with the temperature unit 104, the fan control unit 106, the storage unit 108, and a PSU of the host. The power consumption control unit 110 and the PSU perform signal transmission therebetween through a power supply management bus (not shown).

The fans 102 may be disposed at an air outlet of the cabinet of the host of the computer system, or on a component (such as a CPU chip) disposed on a main board easily to be too hot. The fan control unit 106 is used for controlling a rotating speed of the fans 102. Generally, the fan control unit 106 controls the rotating speed of the fans through a pulse width modulation (PWM) signal. When a duty cycle of the PWM signal is longer, the rotating speed of the fans is higher, and correspondingly, more power is consumed. The temperature detecting unit 104 is used for detecting a temperature inside the host of the computer system.

In addition, the power consumption control unit 110 may calculate a total power consumption of the host of the computer system according to the electric energy provided by the PSU, and send a control signal SC1 to the fans 102 according to the total power consumption of the host of the computer system and the temperature inside the host detected by the temperature detecting unit 104, so as to determine how to control the rotating speed of the fans 102 to adjust the power consumption of the host, in which the control signal SC1 is the PWM signal.

For example, when the power consumption control unit 110 judges that the total power consumption of the host does not exceed a predetermined threshold total power consumption, the power consumption control unit 110 adjusts a duty cycle of the control signal. SC1 according to the temperature inside the host and the power consumption of the CPU at the same time. The predetermined threshold total power consumption herein refers to a minimum total power consumption required by the host in a stable state.

A comparison table of the temperature inside the host, the power consumption of the CPU, and the duty cycle of the corresponding control signal SC1 is shown as Table 1.

TABLE 1

| CPU power (W) | Internal temperature: 10° C. SC1 duty cycle (%) | Internal temperature: 15° C. SC1 duty cycle (%) |
|---|---|---|
| 39 | 12 | 17 |
| 44 | 23 | 27 |
| 51 | 34 | 38 |
| 57 | 44 | 52 |
| 70 | 100 | 100 |

It can be seen from Table 1 that, when the temperature inside the host and the power consumption of the CPU are higher, the heat dissipating effect of the host gets better and therefore, the duty cycle of the control signal SC1 is longer, so as to increase the rotating speed of the fans 102 and dissipate heat energy as quickly as possible. It should be noted that the temperature inside the host of the computer system, the power consumption of the CPU and the corresponding duty cycle value listed in Table 1 are merely an exemplary embodiment, and the actual application is not limited thereby.

In addition, when the power consumption control unit 110 judges that the total power consumption of the host of the computer system exceeds the predetermined threshold total power consumption, the power consumption control unit 110 lowers the rotating speed of the fans 102 according to the power consumptions of the fans 102 corresponding to different rotating speeds, so as to reduce the total power consumption of the host of the computer system to the predetermined threshold total power consumption. A comparison table of the rotating speed and the power consumption of each fan 102 is shown as Table 2.

TABLE 2

| SC1 duty cycle (%) | Fan power (W) | Fan rotating speed (RPM) |
|---|---|---|
| 20 | 9 | 3720 |
| 40 | 27 | 6240 |
| 60 | 63 | 8760 |
| 80 | 127 | 11280 |
| 100 | 199 | 13800 |

As shown in Table 2, when the duty cycle of the control signal SC1 is longer, the power consumption and the rotating speed of the fan are higher. Since the total power consumption of the host is the sum of the power consumptions of components such as the main boards, a hard disk driver, and the fans, the power consumption of the fans 102 can be reduced by lowering the rotating speed of the fans 102 (that is, reducing the duty cycle of the control signal SC1), thereby reducing the total power consumption of the host of the computer system. The power consumption control unit 110 may select a proper rotating speed of the fans 102 according to the calculated total power consumption of the host of the computer system, so as to reduce the total power consumption of the host of the computer system to the predetermined threshold total power consumption. It should be noted that the comparison table of the rotating speed and the power consumption of each fan 102 in Table 2 is merely an exemplary embodiment and the actual application is not limited thereby. In addition, the duty cycle comparison table and the power consumption comparison table may be stored in the storage unit 108, so that the power consumption control unit 110 adjusts the rotating speed of the fans 102 accordingly when the total power consumption of the host of the computer system is too high.

Figure 2:
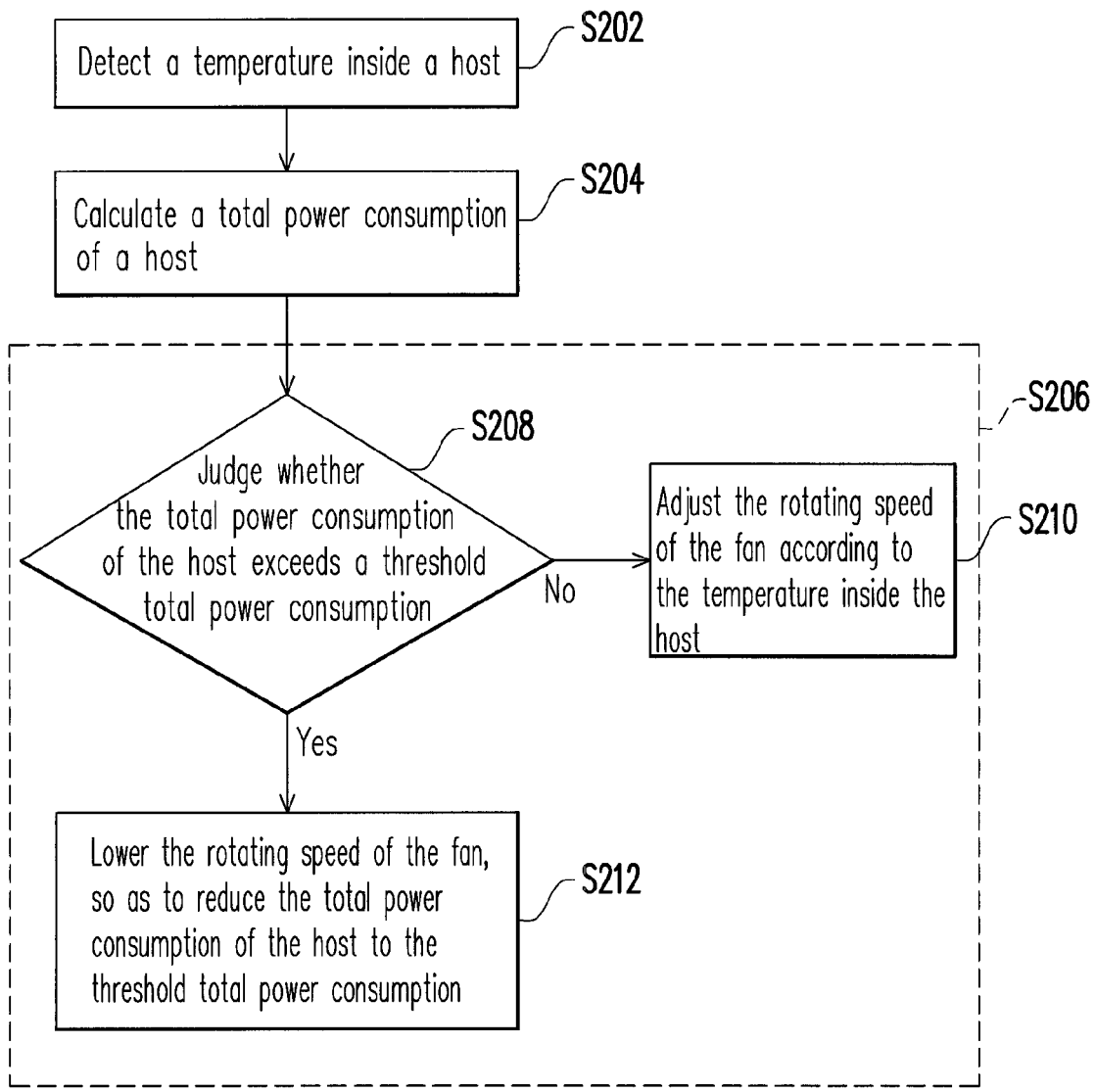
FIG. 2 is a flow chart of a heat dissipating method of the heat dissipating device according to an embodiment of the present invention.

FIG. 2 is a flow chart of a heat dissipating method of the heat dissipating device according to an embodiment of the present invention. Referring to FIG. 2, the heat dissipating method of the heat dissipating device may include the following steps. First, a temperature inside the host of the computer system is detected (Step S202). Then, a total power consumption of the host of the computer system is calculated (Step S204), in which the total power consumption of the host of the computer system includes the power consumptions of components such as main boards, a hard disk driver and a fan. After that, the rotating speed of the fan is adjusted according to the temperature inside the host and the total power consumption of the host (Step S206). Further, Step S206 of adjusting the rotating speed of the fan includes judging whether the total power consumption of the host exceeds a threshold total power consumption (Step S208). The threshold total power consumption refers to a minimum total power consumption required by the host of the computer system when the host is in a stable state. If the total power consumption of the host of the computer system does not exceed the predetermined threshold total power consumption, the rotating speed of the fan is adjusted according to the temperature inside the host of the computer system (Step S210), and the temperature inside the host of the computer system is further detected by returning to Step S202. If the total power consumption of the host exceeds the predetermined threshold total power consumption, the rotating speed of the fan is lowered, so that the total power consumption of the host is reduced to the threshold total power consumption (Step S212).

In conclusion, in the present invention, the rotating speed of the fan is adjusted according to the temperature inside the host of the computer system and the total power consumption of the host. When the total power consumption of the host of the computer system exceeds the predetermined threshold total power consumption, the rotating speed of the fan is lowered, so that the total power consumption of the host of the computer system is reduced to the predetermined threshold total power consumption, thereby accurately controlling the power consumption of the system and avoiding unnecessary power waste.

Although the present invention is disclosed as above with embodiments, it is not limited to the disclosure of the embodiments, and it will be apparent to those of ordinary skill in the art that various alternations and modifications can be made without departing from the scope or spirit of the present invention. Therefore, the protection scope of the present invention depends on those defined by the scope of the following claims.

What is claimed is:

1. A heat dissipating device, applicable to a host, wherein the host comprises a Power Supply Unit (PSU), the heat dissipating device comprising:
    at least one fan;
    a temperature detecting unit for detecting a temperature inside the host;
    a fan control unit coupled with the fan for controlling a rotating speed of the fan; and
    a power consumption control unit coupled with the PSU, the temperature detecting unit, the fan control unit, and the PSU of the host for calculating a total power consumption of the host, and outputting a control signal to the fan control unit according to the temperature inside the host and the total power consumption of the host, so as to adjust the rotating speed of the fan,
    wherein the power consumption control unit adjusts the rotating speed of the fan according to the temperature inside the host when the total power consumption of the host does not exceed a threshold total power consumption, and controls the fan control unit to lower the rotating speed of the fan when the total power consumption of the host exceeds the threshold total power consumption, so as to reduce the total power consumption of the host to the threshold total power consumption.

2. The heat dissipating device according to claim 1, wherein the threshold total power consumption is a minimum total power consumption required by the host in a stable state.

3. The heat dissipating device according to claim 1, further comprising:
    a storage unit coupled with the power consumption control unit for storing a duty cycle comparison table of the temperature inside the host and the control signal, and a comparison table of the rotating speed of the fan and the power consumption of the fan, wherein the power consumption control unit controls the fan control unit to adjust the rotating speed of the fan according to the duty cycle comparison table and the power consumption comparison table.

4. The heat dissipating device according to claim 1, wherein the duty cycle of the control signal is directly proportional to the temperature inside the host.

5. The heat dissipating device according to claim 1, wherein the power consumption control unit and the PSU perform signal transmission therebetween through a power supply management bus.

* * * * *